US008966183B2

(12) United States Patent
Grayson et al.

(10) Patent No.: US 8,966,183 B2
(45) Date of Patent: Feb. 24, 2015

(54) OPPORTUNISTIC CACHE REPLACEMENT POLICY

(71) Applicant: Freescale Semiconductor, Inc., Austin, TX (US)

(72) Inventors: Brian C. Grayson, Austin, TX (US); Jyotsna S. Kartha, Austin, TX (US); Kathryn C. Stacer, Round Rock, TX (US)

(73) Assignee: Freescale Semiconductor, Inc., Austin, TX (US)

(*) Notice: Subject to any disclaimer, the term of this patent is extended or adjusted under 35 U.S.C. 154(b) by 189 days.

(21) Appl. No.: 13/645,050

(22) Filed: Oct. 4, 2012

(65) Prior Publication Data
US 2014/0101387 A1 Apr. 10, 2014

(51) Int. Cl.
G06F 12/12 (2006.01)
G06F 12/08 (2006.01)

(52) U.S. Cl.
CPC .......... G06F 12/128 (2013.01); G06F 12/0842 (2013.01)
USPC ................... 711/130; 711/133; 711/E12.077; 711/E12.039

(58) Field of Classification Search
None
See application file for complete search history.

(56) References Cited

U.S. PATENT DOCUMENTS

| 5,274,790 | A | * | 12/1993 | Suzuki ................... 711/133 |
| 5,353,425 | A | * | 10/1994 | Malamy et al. ............ 711/144 |
| 5,715,427 | A | | 2/1998 | Barrera et al. |
| 6,748,493 | B1 | * | 6/2004 | Arroyo et al. ............. 711/130 |
| 7,055,004 | B2 | | 5/2006 | DeMent et al. |
| 7,133,971 | B2 | | 11/2006 | Matick et al. |
| 7,167,953 | B2 | | 1/2007 | Megiddo et al. |
| 2004/0143708 | A1 | | 7/2004 | Caprioli |
| 2008/0010415 | A1 | | 1/2008 | Sawdey et al. |
| 2009/0006755 | A1 | | 1/2009 | Illikkal et al. |
| 2009/0113137 | A1 | | 4/2009 | Grayson et al. |
| 2009/0217273 | A1 | * | 8/2009 | Mutlu et al. .............. 718/101 |
| 2011/0055485 | A1 | | 3/2011 | Eddy et al. |
| 2011/0310691 | A1 | * | 12/2011 | Zhou et al. ............ 365/230.03 |
| 2013/0346695 | A1 | * | 12/2013 | Loh et al. .................. 711/122 |

OTHER PUBLICATIONS

Freescale Semiconductor, Inc., "MPC750 RISC Microprocessor Family User's Manuel: Section 3.5," Rev.1, Dec. 2001, printed from <<http://www.freescale.com/files/32bit/doc/ref_manual/MPC750UM.pdf>> on Sep. 27, 2012, 7 pages.

* cited by examiner

Primary Examiner — Nathan Sadler

(57) ABSTRACT

A cache management system employs a replacement policy in a manner that manages concurrent accesses to cache. The cache management system comprises a cache, a replacement policy storage for storing replacement statuses of cache lines of the cache, and an update module. The update module, comprising access filtering and a concurrent update handling, determines how updates to the replacement policy storage are handled. In a multi-threaded compute environment, a concurrent access to shared cache causes a selective update to the replacement policy storage.

18 Claims, 4 Drawing Sheets

OPPORTUNISTIC CACHE REPLACEMENT POLICY

FIELD OF THE DISCLOSURE

This disclosure generally relates to the use of caches in processing systems and, more particularly, to management of cache replacement policy status information.

BACKGROUND

A cache management system typically implements a replacement policy to determine which elements of the cache should be discarded in order to bring in new elements when the cache is full. In a typical replacement policy scheme, each access to a cache element causes an update to the replacement status associated with that cache element. In multithreaded applications, multiple threads may share a cache memory and thus there may be concurrent attempted accesses to the cache memory, which can impact cache performance due to the replacement status updates typically performed for such accesses.

BRIEF DESCRIPTION OF THE DRAWINGS

The present disclosure may be better understood, and its numerous features and advantages made apparent to those skilled in the art by referencing the accompanying drawings.

DETAILED DESCRIPTION

FIGS. 1-4 illustrate embodiments of a cache management system employing a replacement policy so as to manage storage of cache elements in a cache. The cache management system comprises a cache, a replacement policy storage for storing replacement policy status information for corresponding elements of the cache, and an update module. The update module determines how update requests to the replacement policy storage are handled. In one aspect of the present disclosure, updates to the replacement policy storage are inhibited for store accesses to the cache while updates are allowed for load accesses, or vice versa. This form of filtering updates to the replacement policy storage can have relatively minor impact to the overall performance yet can significantly reduce update traffic for the replacement policy storage. In another aspect of the present disclosure, updates to the replacement policy storage are selectively inhibited when concurrent updates are requested. For example, accesses from multiple threads sharing the cache may concurrently attempt to access the cache and thus trigger multiple attempted concurrent accesses to the replacement policy storage. When a concurrent update is detected, a selection process determines which of the updates is allowed to update the replacement policy storage while discarding or otherwise inhibiting the others.

A common problem with a processing system having two or more processing threads is the handling of simultaneous or concurrent accesses. Traditionally, when storage elements, such as those used in a replacement policy storage, are required to accommodate concurrent accesses, dual-port or multi-port memories are used. Unfortunately, dual-port memories are significantly more expensive with additional circuitry and complexity. Dual-port memories also create added timing and power challenges. The techniques for concurrent update handling described herein allow performance gains commonly found with multi-threaded processing systems having dual-port cache memories while enabling the utilization of single-port memories, and thus avoiding the costs, complexity, timing and power impact associated with the dual-port or multi-port memories that otherwise would be needed to handle multiple concurrent cache accesses and replacement policy storage updates.

Figure 1:
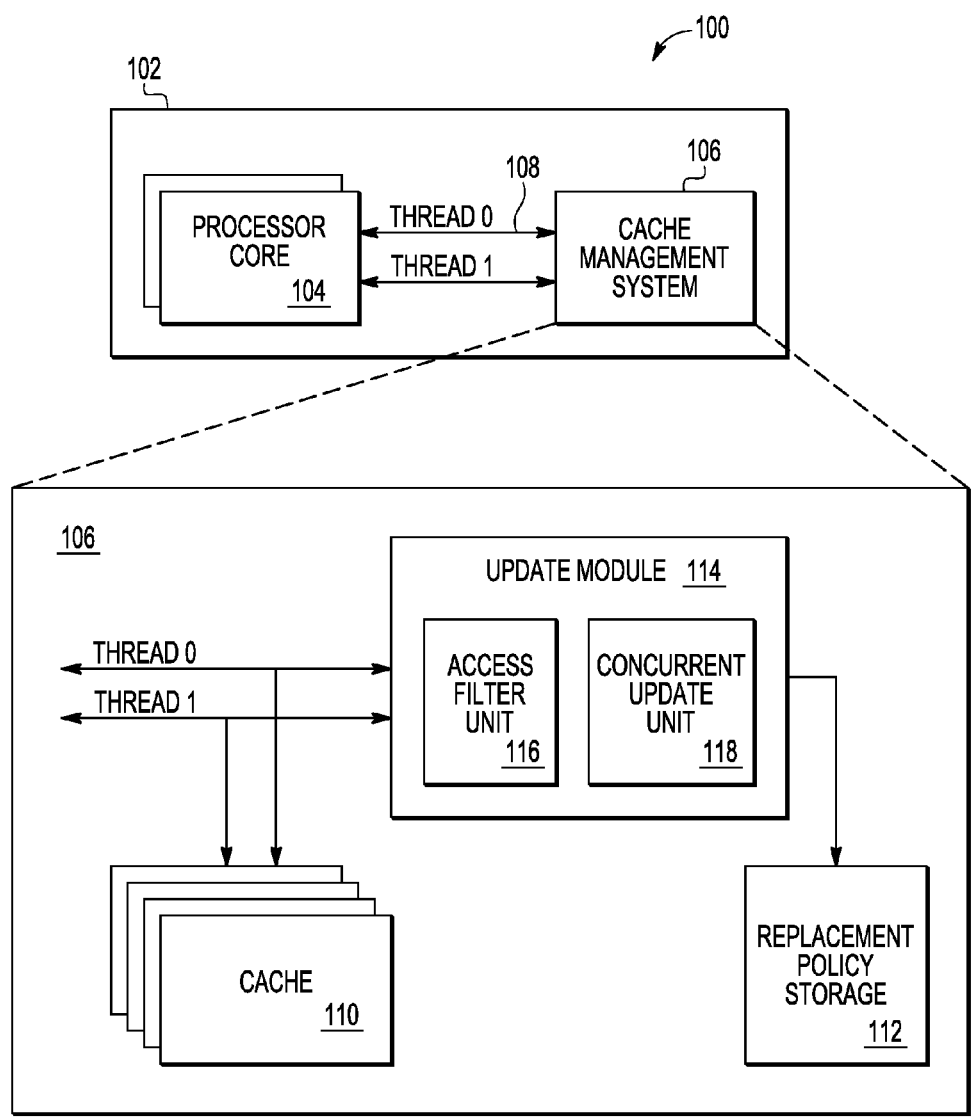
FIG. 1 illustrates a processing system having a cache management system in accordance with at least one embodiment of the present disclosure.

FIG. 1 depicts a processing system 100 according to at least one embodiment of the present disclosure. The processing system 100 includes one or more processor cores 104 and a cache management system 106 employing a cache line replacement policy. The cache management system 106 includes a cache 110, replacement policy storage 112 and an update module 114. In some embodiments, the cache 110 comprises a plurality of cache lines (not shown). When a cache line is accessed, an associated replacement status or age indication is stored as a bit or multiple bits in the replacement policy storage 112. The one or more processor cores 104 are configured to support multiple threads, the execution of which typically relies on data stored in the cache 110 and thus may result in multiple concurrent attempted accesses to the cache 110.

In some embodiments, the cache management system 106 can be implemented as an integrated circuit (IC), for example, in an IC package 102 with, or separate from, the one or more processor cores 104. In some embodiments, the update module 114 can be implemented in circuitry that is separate from the circuitry that includes the cache 110 and the replacement policy storage 112. In at least one embodiment, the replacement policy storage 112 can be a portion or region of a cache tag memory traditionally associated with a cache data array.

Among other features, the update module 114 includes capabilities such as update request filtering and concurrent update handling so as to manage update traffic to the replacement policy storage 112. As noted above, accesses to a cache line of the cache 110 trigger requests to update the corresponding replacement status in the replacement policy storage 112 (e.g., to mark the cache line as recently used). Such requests are referred to herein as "update requests." However, because there may be concurrent cache accesses, there may be concurrent update requests to be processed by the update module 114. To maintain a high efficiency rate with multiple processing threads, the access filter unit 116 of the update module 114 is used to filter update requests to the replacement policy storage 112 based on whether the cache access that triggered the update request is a load-type cache access or a store-type cache access. For example, in some embodiments, updates to the replacement policy storage 112 are inhibited for store accesses to the cache 110 while updates are allowed for load accesses. In some embodiments, updates for store accesses to cache may be allowed while updates for load accesses are inhibited. As such, the access filter unit 116 reduces replacement policy storage traffic while accommodating accesses from more than one thread of execution.

With two or more processing threads 108 executed by the processing system 100, concurrent accesses to cache 110 may occur and cause concurrent updates to the replacement policy storage 112. The concurrent update unit 118 within the update module 114 detects concurrent updates and, using a selection process, determines which individual update of the concurrent updates is allowed to update the replacement policy storage 112 while inhibiting, discarding or not performing the one or more remaining, competing updates. In some embodiments with two processing threads 108, the selection process may alternate between sources, selecting the update from a thread 0 access and inhibiting the competing update from thread 1 on a first concurrent update, and then selecting the update from a thread 1 access and inhibiting the competing update from thread 0 on a second concurrent update, and repeating as needed for the third and successive concurrent updates. With the concurrent update handling techniques disclosed herein, a single-port memory can be used for the replacement policy storage 112 with relatively little impact to performance while accommodating concurrent accesses from multiple processing threads.

The cache management system 106 uses a replacement policy to identify those cache lines to evict in case the cache 110 is full and further elements need to be stored in the cache. In some embodiments, the replacement policy comprises a least-recently used (LRU)-based scheme, such as a Pseudo-Least Recently Used (PLRU) scheme. In some embodiments, the replacement policy comprises a most recently used (MRU) or another LRU-based scheme. In some embodiments, the replacement policy storage 112 comprises a plurality of replacement status entries, each entry associated with a corresponding cache element and storing the replacement status of the corresponding cache element. The term "cache element" is referred to herein as any accessible cache storage element such as bit, byte, nibble, word, or line, for example. In some embodiments, updates to the replacement status entries of the replacement policy storage 112 are inhibited for store accesses to the cache while updates are allowed for load accesses. This modified scheme of inhibiting store access in a PLRU-based replacement policy is referred to herein to as "Pseudo-Least Recently Loaded" or "PLRL." This modified scheme may also be implemented for other replacement policies, such as LRU or MRU policies, using the guidelines provided herein.

Figure 2:
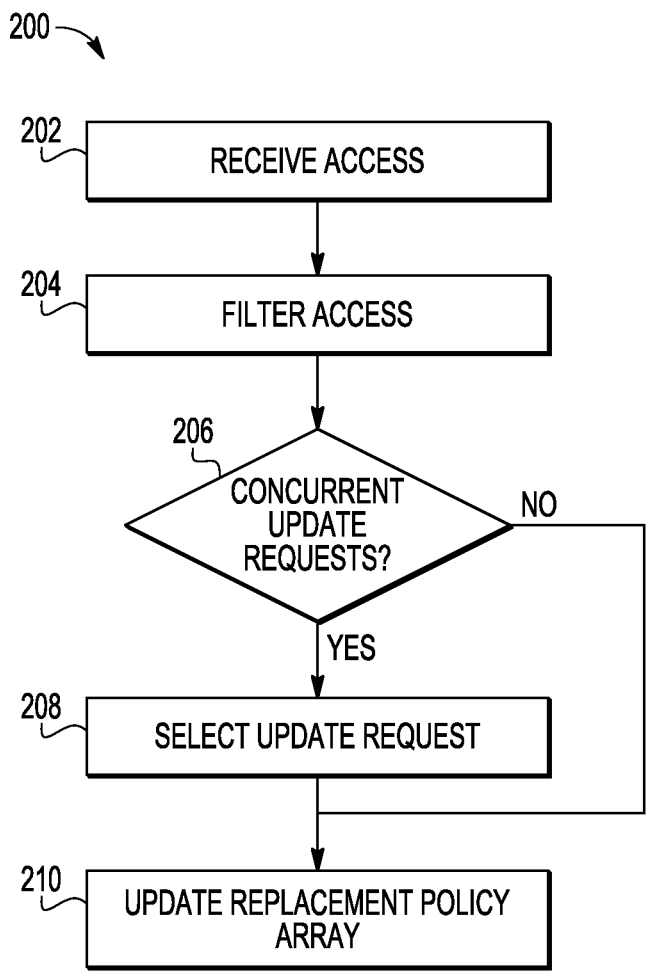
FIG. 2 illustrates a method of cache management in accordance with at least one embodiment of the present disclosure.

FIG. 2 illustrates an example method 200 for a cache management system in accordance with at least one embodiment of the present disclosure. For ease of illustration, the method 200 is described herein in the example context of the cache management system 106 of the data processing system 100 of FIG. 1.

The method 200 initiates at block 202, whereby a cache access is received by the cache management system 106. Each cache access triggers the cache management system 106 to generate a corresponding update request, which is provided to the update module 114.

At block 204, the update requests are filtered based on the access type of the corresponding cache access, such as whether the cache access is a load-type access or a store-type access. In some embodiments, update requests generated from store accesses are inhibited while update requests generated from load accesses are permitted to propagate as an update request to the replacement policy storage. In some embodiments, other criteria may be used to filter updates to the replacement policy storage.

In some embodiments, multiple concurrent cache accesses are initiated by multiple processing threads, thereby generating multiple concurrent update requests. For example, in an embodiment where two threads are processing, and two load accesses to cache 110 occur, then a concurrent request to update the replacement policy storage 112 is generated. If an update request is a single request, then the update request is forwarded to update the replacement policy storage, depicted at block 210.

At block 208, if an update request for the replacement policy storage is a concurrent request, then a selection scheme or process is used to select a single one of the update requests to be processed. In some embodiments with two processing threads, the selection process may alternate between sources, selecting the update request from a first thread access and inhibiting the competing update quest from a second thread on a first concurrent update, and then selecting the update request from the second thread access and inhibiting the competing update request from the first thread on a second concurrent update, and repeating as needed for the third and successive concurrent updates. In some embodiments, rules may determine how the request is selected. In some embodiments, the selection process may be a round robin scheme in which the selection process gives equal priority to the requesting sources. In some embodiments, the selection process may be a FIFO scheme. The update request(s) not selected can be inhibited by, for example, being discarded.

At block 210, the update module 114 performs the update to the replacement status of a corresponding cache line as specified by the filtered and selected update request from blocks 204-208. This update can include, for example, modifying one or multiple bits representing the replacement status so as to reflect that the corresponding cache line was the most recently accessed cache line.

Figure 3:
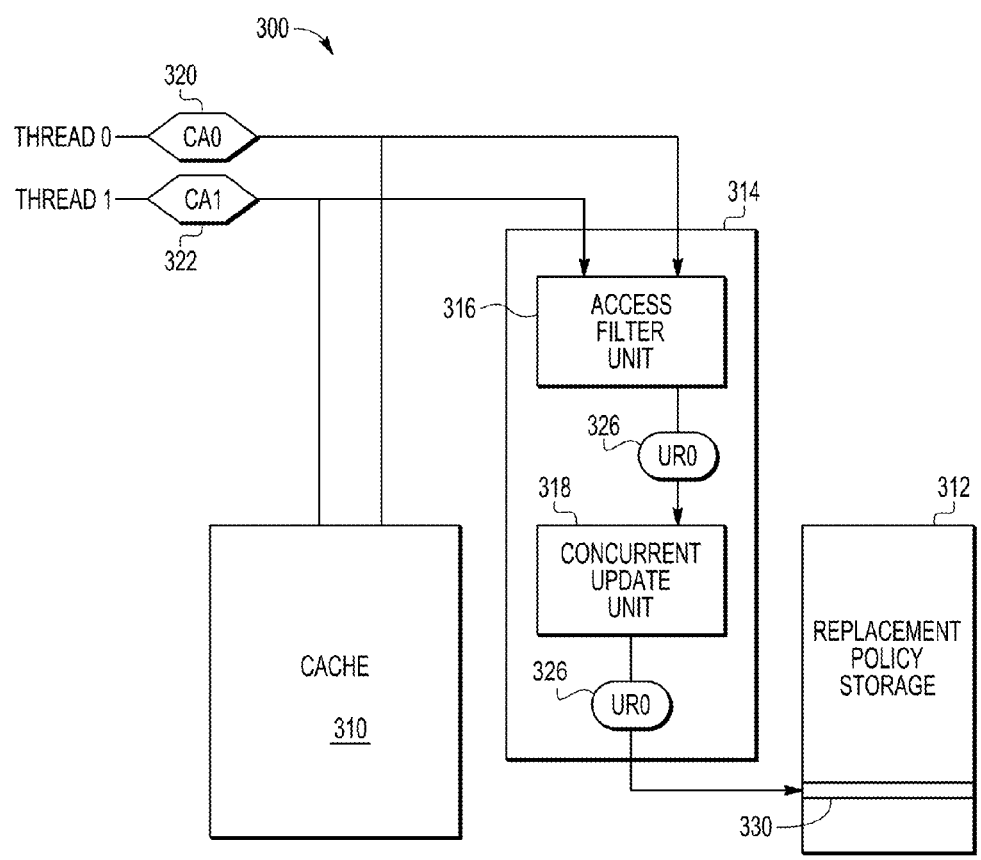
FIG. 3 illustrates an example of a cache management system in accordance with at least one embodiment of the present disclosure.

FIG. 3 illustrates an example operation of the cache management system 106 of the data processing system 100 of FIG. 1 in accordance with the method 200 of FIG. 2. In this example, processing thread 0 and thread 1 share the cache 310. Cache accesses CA0 320 and CA1 322 represent a load access and a store access, respectively. When the update module 314 receives signaling indicative of the cache accesses, the access filter unit 316 allows load access CA0 320 to propagate as an update request UR0 326 to the replacement policy storage 312 and inhibits the store access CA1 322 from propagating or initiating an update request. The resulting update request UR0 326 continues on to update a status field 330 in the replacement policy storage 312 by storing a replacement status for the associated cache access. Since the update request UR0 326 did not compete with any concurrent update requests, the concurrent update unit 318 can be bypassed accordingly and update request UR0 326 updates status field 330 by storing a replacement status for the associated cache access.

Figure 4:
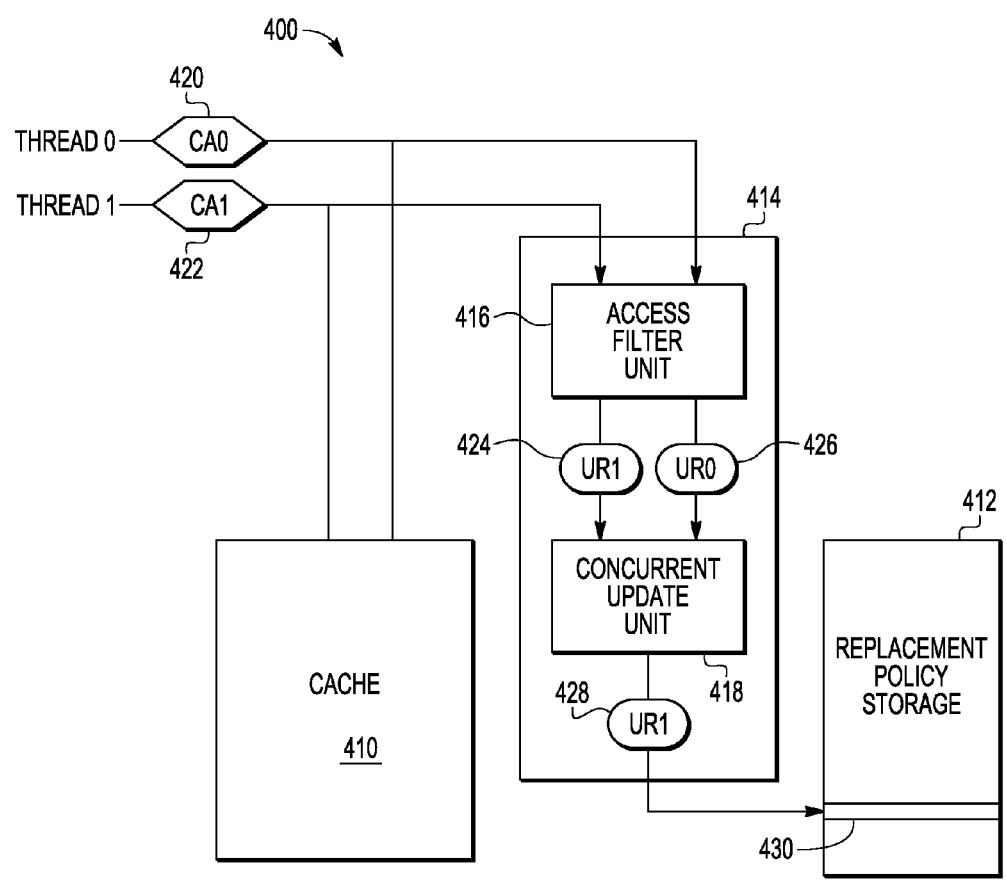
FIG. 4 illustrates another example of a cache management system in accordance with at least one embodiment of the present disclosure.

FIG. 4 illustrates another example operation of the cache management system 106 of the data processing system 100 of FIG. 1 in accordance with the method 200 of FIG. 2. In this example, processing thread 0 and thread 1 share the cache 410. Cache accesses CA0 420 and CA1 422 represent load accesses and are concurrent accesses to the cache 410. Similar to the example in FIG. 3 above, access filter unit 416 of the update module 414 is configured to filter store accesses. When the update module 414 receives the concurrent accesses, the access filter unit 416 allows the load accesses CA0 420 and CA1 422 to propagate as concurrent update requests to the replacement policy storage 412. The concurrent update unit 418 receives the resulting update requests UR0 426 and UR1 424 and through a selection process, chooses UR1 428 to update a storage element 430 in the replacement policy storage 412 by storing a replacement status for the associated cache access accordingly.

In accordance with one aspect of the present disclosure, a processing system includes one or more processors for issuing cache requests, a cache management system including: a cache comprising a plurality of cache lines, a replacement policy storage to store a replacement status for each cache line, and an update module to selectively update the replacement statuses of cache lines in the replacement policy storage, the update module including a concurrent update unit to perform a single update request for the replacement policy storage from a plurality of concurrent update requests, the concurrent update requests resulting from concurrent cache accesses.

In some embodiments, the processing system further includes an access filter unit to filter update requests to the replacement policy storage based on a type of cache access and to provide the concurrent update requests. In some embodiments, the processing system includes the access filter to filter update requests based on the type of cache access including inhibiting update requests to the replacement policy storage for store accesses to the cache and permitting update requests to the replacement policy storage for load accesses to the cache. In some embodiments, the processing system includes the access filter to filter update requests based on the type of cache access including inhibiting update requests to the replacement policy storage for load accesses to the cache and permitting update requests to the replacement policy storage for store accesses to the cache.

In some embodiments, the processing system includes a concurrent update unit to discard the other update requests of the plurality of concurrent update requests. In some embodiments, the replacement policy storage comprises a single port memory. In some embodiments, the replacement policy storage is a component of a cache tag memory. In some embodiments, the cache is shared by a plurality of processing threads.

In some embodiments, the processing system of includes the concurrent update unit to select the single update request to be performed from a plurality of concurrent update requests based on a round robin scheme. In some embodiments, the processing system includes the concurrent update unit to select the single update request to be performed from a plurality of concurrent update requests based on a first-in, first-out (FIFO) scheme. In some embodiments, the one or more processors cores share the cache. In some embodiments, the one or more processors and the cache management system are implemented on an integrated circuit.

In accordance with another aspect of the present disclosure, a method of cache management, includes generating update requests for a replacement policy storage responsive to accesses to a cache, the replacement policy storage storing a replacement status for each cache line of the cache, and selectively updating the replacement policy storage responsive to the update requests wherein the selectively updating includes selecting and performing a single update request to the replacement policy storage for a concurrent update request using a selection process, the concurrent updates resulting from concurrent cache accesses.

In some embodiments, the method further includes filtering the update requests based on type of the corresponding cache accesses, said concurrent update request comprising a plurality of filtered concurrent update requests. In some embodiments, filtering the update requests includes inhibiting update requests to the replacement policy storage for store accesses to the cache and permitting update requests to the replacement policy storage for load accesses to the cache. In some embodiments, filtering the update requests includes inhibiting update requests to the replacement policy storage for load accesses to the cache and permitting update requests to the replacement policy storage for store accesses to the cache.

In some embodiments, the method further includes selecting a cache line of the cache for replacement using the replacement policy storage and a pseudo-least recently used (PLRU) scheme. In some embodiments, the method further includes selecting a cache line of the cache for replacement using the replacement policy storage and a most recently used (MRU) scheme. In some embodiments, the concurrent cache accesses are generated by a plurality of threads executing concurrently at a plurality of processor cores sharing the cache.

In accordance with another aspect of the present disclosure, a processing system comprising a cache and a replacement policy storage storing a replacement status for each cache line of the cache includes concurrently generating a first plurality of update requests for the replacement policy storage responsive to a plurality of concurrent cache accesses, filtering the first plurality of update requests based on a type of cache access for each update request to generate a second plurality of update requests, selecting and performing a single update request of the second plurality of update requests to update the replacement policy storage, and not performing the remaining update requests of the second plurality of update requests.

In some embodiments, filtering the first plurality of update requests includes not performing update requests for store accesses to the cache. In some embodiments, the method further includes selecting a cache line for removal from the cache based on the replacement statuses of the cache lines stored at the replacement policy storage.

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A processing system, comprising:
one or more processors for issuing cache requests; and
a cache management system, comprising:
a cache comprising a plurality of cache lines;
a replacement policy storage to store a replacement status for each cache line;
an update module to selectively update the replacement statuses of cache lines in the replacement policy storage, the update module comprising:
a concurrent update unit to perform a single update request for the replacement policy storage from a plurality of concurrent update requests, the concurrent update requests resulting from concurrent cache accesses; and
an access filter unit to filter update requests to the replacement policy storage based on a type of cache access and to provide the concurrent update requests, the access filter unit to:
inhibit update requests to the replacement policy storage for store accesses to the cache; and
permit update requests to the replacement policy storage for load accesses to the cache.

2. The processing system of claim 1, wherein a concurrent update unit is to discard unselected update requests of the plurality of concurrent update requests.

3. The processing system of claim 1, wherein the replacement policy storage comprises a single port memory.

4. The processing system of claim 1, wherein the concurrent update unit is to select the single update request to be performed from a plurality of concurrent update requests based on a round robin scheme.

5. The processing system of claim 1, wherein the concurrent update unit is to select the single update request to be performed from a plurality of concurrent update requests based on a first-in, first-out (FIFO) scheme.

6. The processing system of claim 1, wherein the replacement policy storage is a component of a cache tag memory.

7. The processing system of claim 1, wherein the one or more processors share the cache.

8. The processing system of claim 7, wherein the one or more processors and the cache management system are implemented on an integrated circuit.

9. A method of cache management, comprising:
generating update requests for a replacement policy storage responsive to accesses to a cache, the replacement policy storage storing a replacement status for each cache line of the cache; and
selectively updating the replacement policy storage responsive to the update requests, wherein the selectively updating includes:
selecting and performing a single update request to the replacement policy storage for a concurrent update request using a selection process, the concurrent updates resulting from concurrent cache accesses filtering the update requests based on type of the corresponding cache accesses, said concurrent update request comprising a plurality of filtered concurrent update requests, wherein filtering the update requests comprises:
inhibiting update requests to the replacement policy storage for store accesses to the cache; and
permitting update requests to the replacement policy storage for load accesses to the cache.

10. The method of claim 9, further comprising:
selecting a cache line of the cache for replacement using the replacement policy storage and a pseudo-least recently used (PLRU) scheme.

11. The method of claim 9, wherein the concurrent cache accesses are generated by a plurality of threads executing concurrently at a plurality of processor cores sharing the cache.

12. The method of claim 9, further comprising discarding unselected update requests of a plurality of concurrent update requests.

13. The method of claim 9, further comprising selecting the single update request to be performed from a plurality of concurrent update requests based on a round robin scheme.

14. The method of claim 9, further comprising selecting the single update request to be performed from a plurality of concurrent update requests based on a first-in, first-out (FIFO) scheme.

15. In a processing system comprising a cache and a replacement policy storage storing a replacement status for each cache line of the cache, a method comprising:
concurrently generating a first plurality of update requests for the replacement policy storage responsive to a plurality of concurrent cache accesses;
filtering the first plurality of update requests based on a type of cache access for each update request to generate a second plurality of update requests;
selecting and performing a single update request of the second plurality of update requests to update the replacement policy storage; and
not performing the remaining update requests of the second plurality of update requests.

16. The method of claim 15, wherein filtering the first plurality of update requests comprises:
not performing update requests for store accesses to the cache.

17. The method of claim 15, further comprising:
selecting a cache line for removal from the cache based on the replacement statuses of the cache lines stored at the replacement policy storage.

18. The method of claim 15, wherein filtering the first plurality of update requests comprises:
not performing update requests for load accesses to the cache.

* * * * *